March 4, 1930.     R. H. CRISLER     1,749,274
DUMPING TRUCK TRAIN
Filed June 13, 1927     2 Sheets-Sheet 1
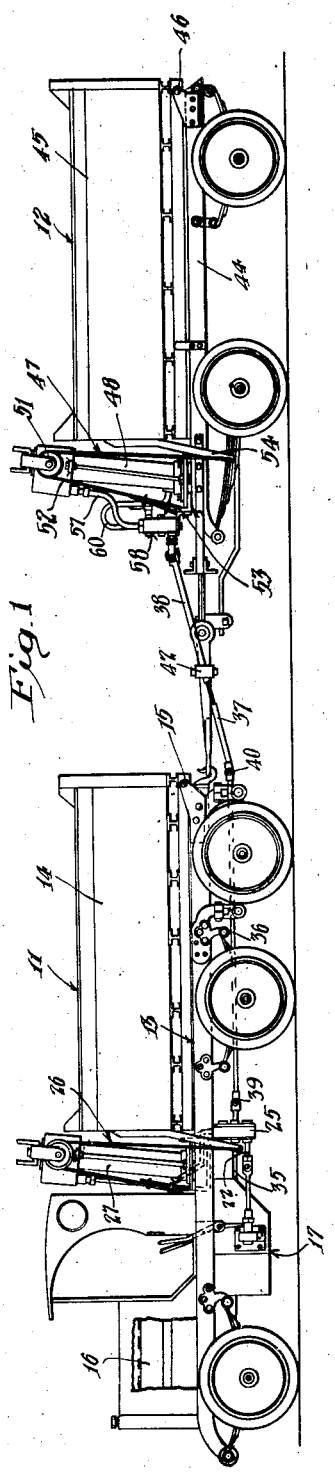
Inventor
Ray H. Crisler
By Lyon & Lyon
Attorneys March 4, 1930.  R. H. CRISLER  1,749,274
DUMPING TRUCK TRAIN
Filed June 13, 1927  2 Sheets-Sheet 2
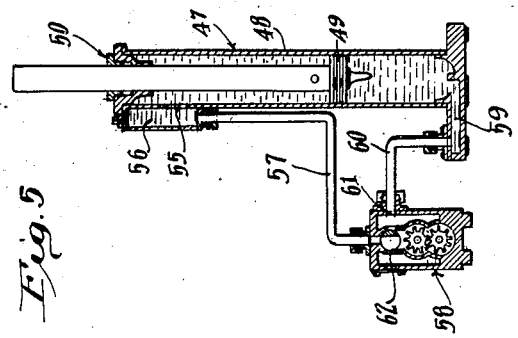
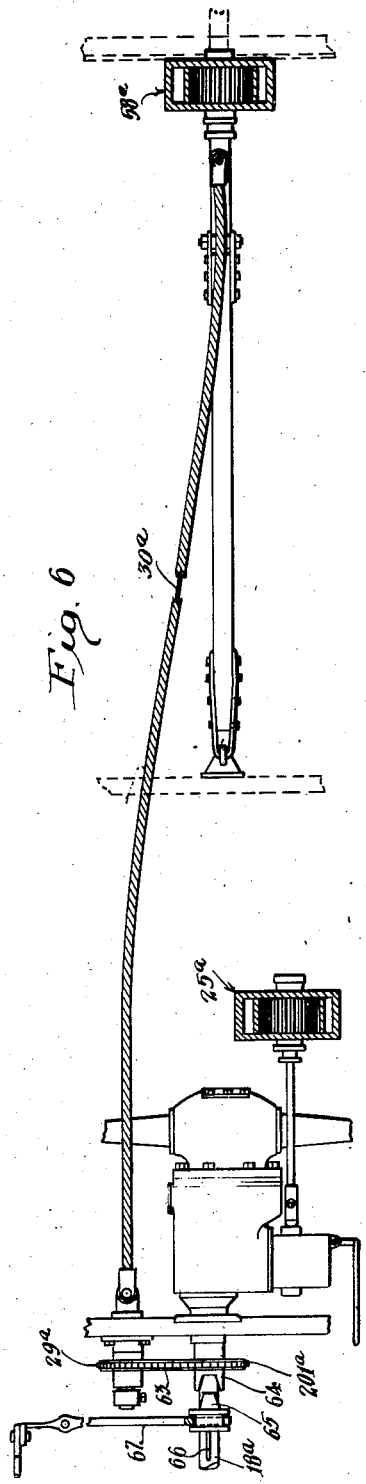
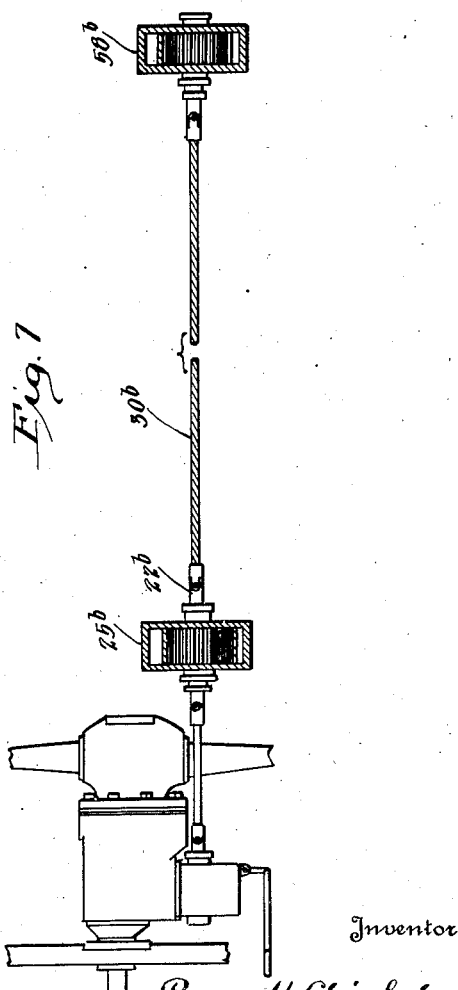
Inventor
Ray H. Crisler
By
Lyon & Lyon
Attorneys Patented Mar. 4, 1930

1,749,274

UNITED STATES PATENT OFFICE

RAY H. CRISLER, OF GLENDALE, CALIFORNIA

DUMPING TRUCK TRAIN

Application filed June 13, 1927. Serial No. 198,498.

This invention relates to dumping truck trains, in other words to a construction embodying a motorized dumping truck and one, or more, dumping trailers attached to said truck and operated by the motor to discharge their loads.

An object of the invention is to reduce the cost of hauling materials of the character that can be dumped by elevating one end of the trailer body.

At present, sand, mortar and other loose materials of this character are transported in motorized trucks provided with dumping mechanism which operates on the truck body to tilt the same to discharge the contents therefrom. Dumping trailers have not heretofore been employed in connection with the motorized truck for hauling loose materials. This invention makes it possible to employ a train of vehicles provided with tilting bodies and makes possible the tilting of said bodies, either independently of one another or simultaneously.

Another object of the invention is simplicity of construction and operation.

The invention may be variously embodied and the accompanying drawings illustrate several different forms thereof:

Fig. 1 is a side elevation of a dumping truck train constructed in accordance with the provisions of this invention.

Fig. 2 is an enlarged plan view, partly in section, of the operating connections between the pump on the trailer and the transmission of the motor truck.

Fig. 3 is an enlarged sectional detail on the line indicated by 3—3, Fig. 2.

Fig. 4 is a broken plan view of the trailer tongue.

Fig. 5 is a sectional elevation of one of the pumps, and the cylinder connected therewith, the view also showing the associated plunger.

Fig. 6 is a plan view, partly in section, showing a modified form of driving connection between the trailer pump and the transmission of the motor truck.

Fig. 7 is a plan view, partly in section, of a third modification of the driving connections between the trailer pump and the transmission of the motor truck.

The form of the invention illustrated in Figs. 1 to 5 inclusive will first be described as follows:

A dumping truck train embodying the invention is illustrated in its entirety in Fig. 1 of the drawings and said train, in this instance, comprises a motorized dumping truck, indicated in general by the character 11, and a dumping trailer, indicated in general by the character 12.

The truck 11 comprises a chassis 13 and a body 14, tiltably mounted on the chassis. The fulcrum for the body 14 is indicated at 15.

On the chassis 13 is mounted a motor 16 which is connected by suitable driving mechanism to certain of the chassis wheels, in a manner well understood in this art, to effect driving of the truck. This driving mechanism includes a transmission, indicated in general by the character 17, and the motor shaft being indicated at 18. As is customary, in dump trucks, in mesh with one of the gears 19 of the transmission is a gear 20, slidably mounted by a spline 21 on a shaft 22. The shaft 22 turns in bearings 23, 24 of the transmission case and drives a pump 25. The pump 25 constitutes a portion of a body hoisting mechanism, which is indicated in general by the character 26, and which also includes a cylinder 27. This hoisting mechanism is constructed in a manner well understood in the art relating to dumping trucks and, accordingly, need not be further described at this time. To those skilled in this art it is readily understood that when the gear 20 is thrown into mesh with the gear 19, by operation of the gear shifting mechanism 28, the pump 25 will be operated to pump a liquid into the cylinder 27 beneath the plunger in said cylinder, so as to raise said plunger and tilt the body 14, thus dumping the contents therefrom.

In mesh with one of the gears 201 of the transmission 17 is another gear 29 on a shaft 30 which turns in bearings 31, 32 of the transmission case. The gear 29 is slidably mounted by a spline 33 and is shifted into and out of mesh with the gear 201 by shifting mechanism 34. The shaft 30 comprises a number of sections 35, 36, 37 and 38. The sections 35, 36 are connected by a universal joint 39 and the sections 36, 37 are connected by a universal joint 40, thus enabling the section 37 to be offset from the section 35. The section 37 is slidably connected with the section 38 and, in this instance, telescopes within the section 38, as indicated at 41. The section 37 turns in a bracket bearing 42 which is secured to a draft device or tongue 43 that connects the trailer 12 to the truck 11. Sections 37, 38 extend aslant upwardly and rearwardly. This construction of the shaft 30 permits of all relative motions between the truck 11 and trailer 12 as will be occasioned in the traveling of the train over uneven surfaces and around curves in the roadway.

The trailer 12 comprises a chassis 44 and a body 45 tiltably mounted on said chassis. The fulcrum for the body 45 is indicated at 46 and the hoist mechanism whereby the body 45 is tilted is indicated, in general, by the character 47. The hoist mechanism 47 is of the same construction as the hoist mechanism 26 and is illustrated in detail in Fig. 5 and, accordingly, Fig. 5 amply illustrates both hoist mechanisms, and a description of the mechanism 47 will also suffice for the mechanism 26 and is as follows:

A cylinder 48 is mounted on the frame of the chassis 44 and mounted to work in said cylinder is a plunger 49. The plunger 49 projects through a stuffing box 50 and the upper end of the plunger carries a pulley 51. Passing over the pulley 51 is a cable 52 which is secured at one end at 53 to the frame of the chassis. The other end of the cable 52 connects with an arm 54 extending downwardly from the forward end of the trailer body 45. In the cylinder 48 is a port 55 communicating with a chamber 56. The chamber 56 is connected by pipe 57 to a gear pump 58. The lower end of the cylinder 48 is provided with a port 59 which is connected by a pipe 60 to the outlet 61 of the pump 58. A three-way valve 62 controls the flow of liquid to and from the pump, in a manner well understood in this art, so as to effect raising of the trailer body when the pump 58 is operated and so as to effect holding of the trailer body in different tilted positions and lowering of said body. The pump 58 is driven by the shaft section 38.

The construction and operation of the form of the invention illustrated in Figs. 1 to 5 inclusive will be understood from the foregoing description and, briefly stated, the operation is as follows:

The dumping truck train having arrived under its own power at the place where the materials carried thereby are to be deposited, the operator will throw the gear 20 into mesh to effect tilting of the truck body 14 and, at the same time, or before or after dumping the truck body, he will throw the gear 29 into mesh to effect dumping of the trailer body 45. When he throws the gear 29 into mesh, the shaft 30 will be turned, thus operating the pump 58. The operator will then turn the three-way valve 62 to the appropriate position to cause the operating fluid to be forced into the lower end of the cylinder 48 beneath the plunger, thus driving said plunger upwardly and raising the forward end of the trailer body 45. When the trailer body has been tilted to the desired angle, it will be held in that position by turning the three-way valve to a position to close off the pipe 60. The gear 29 may then be thrown out of mesh. To lower the body 45, the three-way valve 62 will be turned into position to admit liquid from the pump to the pipe 57 and to permit liquid to discharge from the pipe 60 into the pump.

It is to be understood that the hoist mechanism 47, illustrated in Fig. 5, is merely typical and that any other fluid operated hoist mechanism may be employed in place of the mechanisms 26, 47.

In the modification illustrated in Fig. 6, the elements that function the same as those hereinbefore described are indicated by the same reference characters with the addition of the letter "a". In this instance the shaft $30^a$ is a continuous flexible shaft and the same is set into operation by a slightly different construction than employed for operating the shaft 30. On the forward end of the shaft $30^a$ is a sprocket wheel $29^a$ driven by sprocket chain 63 that, in turn, is driven by a sprocket wheel $201^a$ loosely mounted on the engine shaft $18^a$. On the hub of the sprocket wheel $201^a$ is a clutch member 64 adapted to be engaged by another clutch member 65, which is slidably mounted by a spline 66 on the engine shaft $18^a$. A shifting fork 67 is provided for shifting the clutch member 65 to and from engagement with the clutch member 64.

When it is desired to dump the trailer body with this form of the invention, the clutch 64, 65 will be engaged, thus operating the shaft $30^a$ so as to operate the pump $58^a$.

In the modification illustrated in Fig. 7, the elements that function the same as those described for the form of invention illustrated in Figs. 1 to 5 inclusive, are indicated by the same reference characters with the addition of the letter "b". In this instance, the forward end of the shaft $30^b$ connects with the shaft $22^b$ of the pump $25^b$. This form of the invention requires less parts than and is easier to install than the other two described above though, to operate the pump $58^b$, it is necessary to also operate the pump $25^b$. Simultaneous operation of the pumps $25^b$, $58^b$ would not be undesirable when simultaneous dumping of the truck and trailer bodies is desired, but if the trailer body is to be dumped at another time than the dumping of the truck body, it would, with this arrangement, be necessary to operate the pump $25^b$ in order to effect operation of the pump $58^b$.

I claim:

A dumping truck train comprising a motor driven truck provided with a tiltably mounted body, a trailer provided with a tiltably mounted body, a draft device connecting the truck and trailer, fluid pressure operated mechanisms on the truck and trailer for tilting the respective bodies, said mechanisms including pumps, a transmission on the truck operably connected with the motor, a shaft operably connected with the pump on the truck, a gear splined on said shaft, a means to move the gear into and out of operative relation with the transmission, and a shaft operably connecting the pump on the trailer with the first mentioned shaft.

Signed at Los Angeles, Calif., this 26th day of May 1927.

RAY H. CRISLER.